United States Patent [19]

Zimmermann

[11] Patent Number: 4,605,225
[45] Date of Patent: Aug. 12, 1986

[54] POURING SPOUT HAVING AN INSERT

[75] Inventor: Anso Zimmermann, Bad Hersfeld, Fed. Rep. of Germany

[73] Assignee: Rotpunkt Dr. Anso Zimmermann, Niederaula, Fed. Rep. of Germany

[21] Appl. No.: 606,152

[22] Filed: May 2, 1984

[30] Foreign Application Priority Data

May 10, 1983 [DE] Fed. Rep. of Germany ....... 3317106

[51] Int. Cl.⁴ ............................................. B65D 25/42
[52] U.S. Cl. ................................... 222/566; 222/564; 239/591; 215/13 A
[58] Field of Search ............... 222/567, 569, 566, 540, 222/465 R, 465 A, 542, 519, 520, 131, 183, 479, 571, 572, 564, 575; 239/591, 592, 590, 590.3; 215/12 R, 12 A, 13 R, 13 A, 307, 309

[56] References Cited

U.S. PATENT DOCUMENTS

| 128,810 | 7/1872 | Parker | 222/465 R |
|---|---|---|---|
| 628,652 | 7/1899 | Dunlap | 222/465 R |
| 977,932 | 12/1910 | Cole | 222/567 |
| 1,992,490 | 2/1935 | Lewis | 239/591 X |
| 2,160,602 | 5/1939 | Nagel | 222/567 |
| 2,266,570 | 12/1941 | Searls | 222/465 R |
| 2,535,837 | 12/1950 | Coyle | 222/566 |
| 2,793,021 | 5/1957 | Courtney | 222/569 |
| 3,831,857 | 8/1974 | Scott | 222/567 |
| 3,844,450 | 10/1974 | Johnson | 222/183 |
| 3,926,348 | 12/1975 | Lutzker | 222/567 X |
| 4,230,238 | 10/1980 | Wilson | 222/571 X |

FOREIGN PATENT DOCUMENTS

| 216358 | of 1908 | Fed. Rep. of Germany | 222/567 |
|---|---|---|---|
| 1297305 | 12/1969 | Fed. Rep. of Germany | 222/567 |
| 3316941 | 11/1984 | Fed. Rep. of Germany | 215/13 A |
| 896600 | 2/1945 | France | 239/591 |
| 1335611 | 7/1963 | France | 222/183 |
| 1181289 | 8/1968 | United Kingdom | 222/183 |

Primary Examiner—Joseph J. Rolla
Assistant Examiner—Kevin P. Shaver
Attorney, Agent, or Firm—Lewis H. Eslinger

[57] ABSTRACT

A container (3) having a pouring section (1) is outlined, the pouring channel (6) of which makes optimum pouring action possible. The pouring section (1) consists of a portion (8), which is formed on the container (3), having a section (10) of the pouring channel (6) facing the interior space (9) and a widened part (11), which borders thereon. An internal portion (12) having the other section (13) of the pouring channel (6), which portion may be inserted into the widened part (11) preferably in a liquid-tight manner. The internal portion (12) can be glued, welded or snapped into the widened part (11).

12 Claims, 8 Drawing Figures

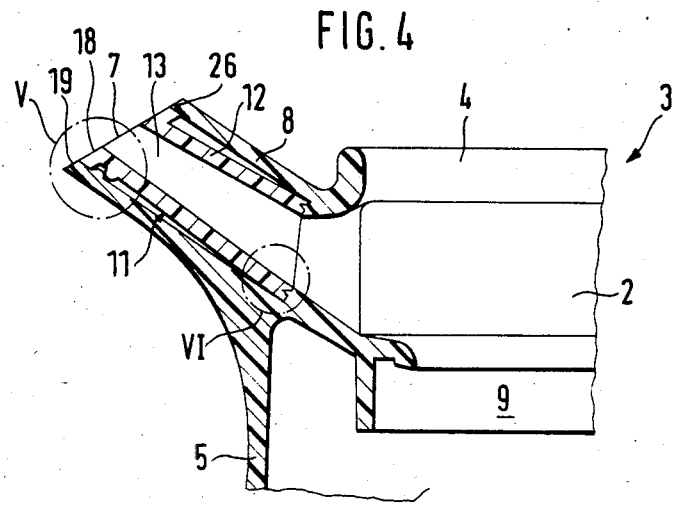
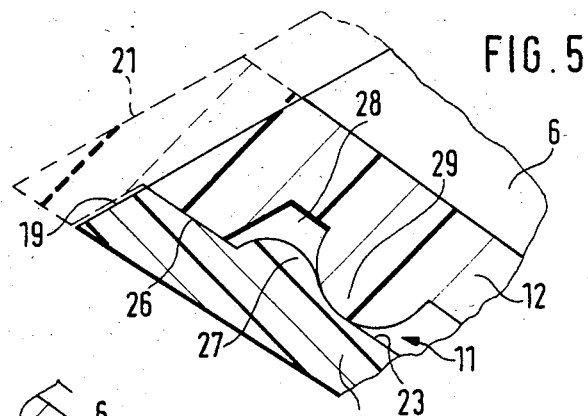
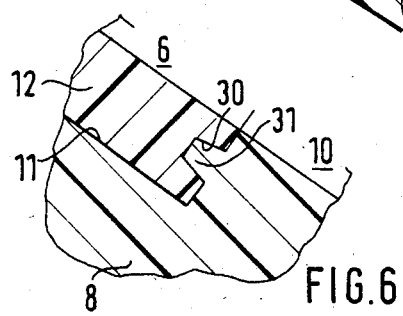
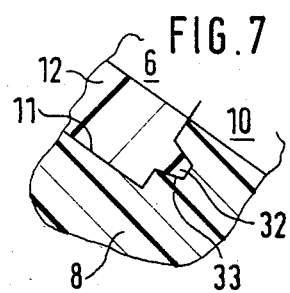

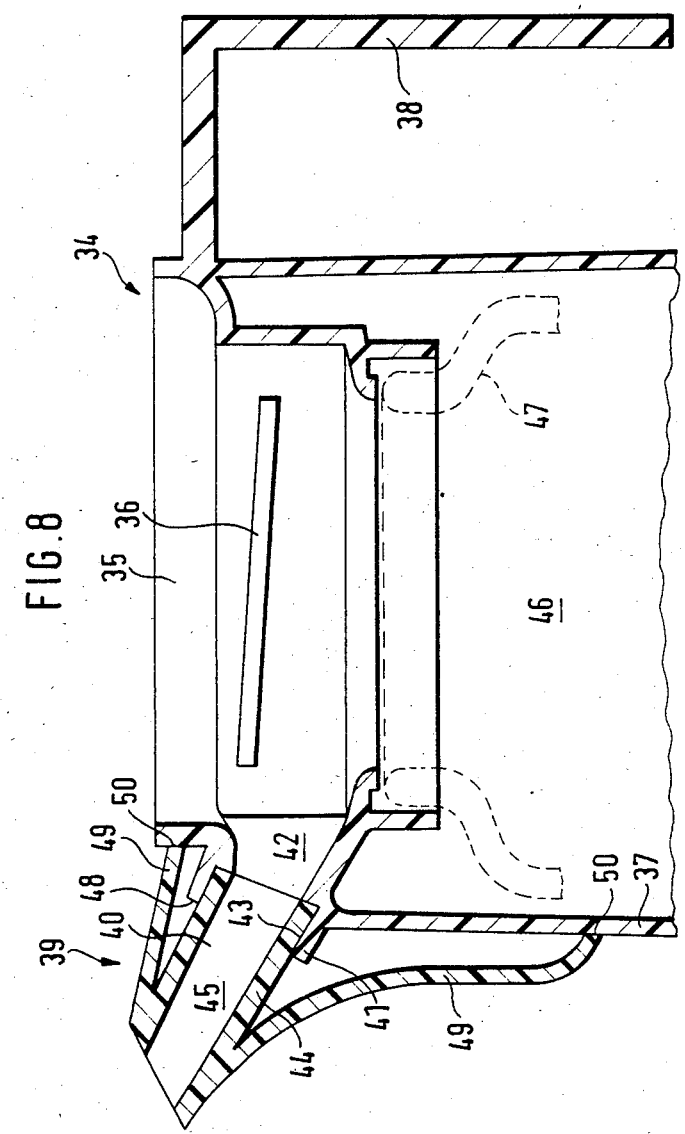

POURING SPOUT HAVING AN INSERT

TECHNICAL FIELD OF THE INVENTION

The invention relates to a multipart pouring section which forms a tube-like spout with a cone-shaped pouring channel which does not widen towards the outside, for containers which may at least to some extent be produced according to an injection moulding process, and in which at least one portion of the container and at least one portion of the pouring section are constructed in one piece; and also to a method for producing a container having a pouring section of this kind, with which method moulding is carried out about cores which are then drawn out for the purpose of release from or opening of the mould.

BRIEF DESCRIPTION OF THE PRIOR ART

Pouring sections of containers serve to make it possible for a liquid, which is held in a container, to be poured out in a controlled manner. Such containers may serve to store cold or warm liquids. The containers can be insulating containers which have a casing and an insulating container which is arranged inside the casing. In the case of such containers it can also be a question of an insert which is provided with a form of heat insulation. The container is usually made of synthetic material; the insert can also be made of glass or plexiglass. The container as a whole can also be made of plexiglass. The container need not necessarily be in one piece; it can be constructed so that it has many parts.

Drink containers and insulating jugs with open pouring spouts are, for example, known. Indeed, such open spouts can be produced in a comparatively simple manner, in which the shape or course of the groove-type pouring channel can be constructed as desired. However, it is not possible to achieve an optimum pouring action, more particularly spillage of the liquid when pouring out cannot be avoided with any certainty.

This problem is overcome by means of tube-like spouts. However, difficulties arise when producing containers having a pouring section with a tube-like spout.

In a known insulating jug the tube-like spout is achieved by covering the upwardly open groove-shaped pouring channel of a container with an open spout by a sealing plate which is mounted on the pouring section. This sealing plate can be glued on, welded on or snapped on. However, between the plate and the pouring section there is a separating line which is visible externally and which gets dirty very easily, this being unfavorable, more particularly in the case of light-colored pouring sections. Furthermore, an optimum pouring channel which extends tubularly or which is tapered outwards in a cone-shaped manner having an opening with a small cross section at the end farthest from the container and an opening with a large cross section at the other end in communication with a neck portion of the container, cannot be produced with this method, as for this purpose wall thicknesses which are too large are required, something with which injection moulding techniques cannot cope.

Attempts have already been made to produce a pouring section with a tube-like spout and optimally formed pouring channel. In the case of production using injection moulding techniques, moulding is carried out about a core portion which, after moulding, for the purpose of removal from the mould must be drawn out in the direction of the interior space of the container. This is, however, only possible, in terms of manufacturing techniques, if the core portion can actually be drawn out to the interior space. This, in turn is only possible if, on the one hand, the upper portion of the container comprising the pouring section is produced separately and if, on the other hand, it is specially constructed so that it is possible to draw the core portion out. This upper portion can, therefore, only be constructed as a very narrow ring. Moreover, not just any, but only certain inclinations of the pouring channel in respect of the plane of the ring make it possible to draw the core out. In addition, no handle can be formed on this upper portion any more, as the handle lies opposite the pouring section and thereby precludes the action of drawing out the core portion.

A container does not only have to have an attractive exterior and a good internal design, but must also make optimum pouring possible during use, and it must be possible, in addition, to produce the container in a simple manner if only for reasons of cost. If pouring sections with optimum pouring action are, therefore, developed for a container then, when realizing this development, it becomes necessary to effect a change in the shape which change is not to the benefit of the pouring action, in order to make production possible. In practice, this means that there must be a departure from the cone-shaped pouring channel which effects optimum pouring, or that a special design must be chosen for the container.

OBJECTS OF THE INVENTION

It is therefore the object of the invention to construct a pouring section of the kind specified in the introduction in such a way that, irrespective of the shape of the container, a pouring section which has an optimum pouring action and which may be produced in a simple manner, is available.

Furthermore, a method is to be outlined which makes it possible to produce containers which are provided with such pouring sections in a simple manner.

SUMMARY OF THE INVENTION

In the case of a pouring section of the kind specified in the introduction, the object is achieved according to the invention through the characterizing features of claim 1.

This pouring section is developed through the features of the subclaims.

In the case of a method of the kind specified in the introduction, the object is achieved according to the method as described hereinafter.

The invention is therefore based on the consideration that technically in a comparatively simple manner it is possible, upon removal from the mould, to draw-out a (short) core portion inwards and to draw-out another core portion outwards and that, furthermore, technically it is possible to make a separate portion which, on the one hand, comprises one portion of the pouring channel and which, on the other hand, may be inserted into the space formed by the core which has been drawn-out outwards.

In this way, limitations in respect of the shape of the pouring section and of the container from the point of view of being able to remove the pouring channel from the mould no longer exist. Thus, on the one hand, the container can be designed and made in accordance with the desired attractive shape and, furthermore, the pouring section can be adapted on its exterior to this shape and, in addition, can have an optimally formed pouring channel. There are no restrictions with regard to the shaping of the exterior of the pouring section; joints, which can get dirty, no longer exist. It is to be noted thereby that the production is extremely favorable in terms of cost. Furthermore, it is advantageous that if during use it emerges that the pouring channel is not yet optimum, the desired pouring action can be achieved by modifying the internal portion and this means that merely the shape for the small internal portion has to be modified, yet the shape for the rest of the container, which in contrast is very large, can remain unchanged, this obviously being favorable in terms of cost for the production of the moulds necessary for the manufacture. In addition, it is to be noted that in the event of damage, the internal portion can be exchanged for another in a simple manner. Finally, if the internal portion is produced from a different material and/or a material which is of a different color, special effects, more particularly with regards to design, can be achieved. Pouring sections which have an ideal pouring action, which are not dependent upon the outer shape of the pouring section and of the container and which, in addition, may be produced in a simple and cost-effective manner, may thus be obtained. Furthermore, even a drip-preventing edge can be produced on the internal portion with an ideal cross section irrespective of the shape of the pouring section by means of a small, simple mould. Furthermore, with suitable construction the same internal portion can be used for differently shaped pouring sections or containers.

In a special method of production, the container or that portion of the container on which the portion of the pouring section leading to the interior space is formed can be produced by introducing the previously produced internal portion which has been removed from its mould, into the mould for the container or container portion and by injection-moulding the container or the container portion about this internal portion using the container or container portion core portion which is to be removed towards the interior from the mould. It must be noted thereby that the methods of production, which are most favorable in terms of cost, may be used quite generally, more particularly plastic injection-moulding processes may be used.

BRIEF DESCRIPTION OF THE DRAWINGS

The invention is explained in greater detail with the aid of the exemplary embodiments represented in the drawing, in which:

FIG. 4 shows in section view another embodiment of that portion of the pouring section which is formed on the container and also of the internal portion;

FIG. 5 shows in section view the item V in FIG. 4 on an enlarged scale;

FIG. 6 shows in section view the item VI in FIG. 4 on an enlarged scale;

FIG. 7 shows another embodiment of the embodiment represented in FIG. 6; and

FIG. 8 shows in section view another embodiment of that portion of the pouring section which is formed on the container portion and of that internal portion of the pouring section which is inserted into the widened part of the pouring section.

DETAILED DESCRIPTION OF THE PREFERRED EMBODIMENT OF THE INVENTION

Figure 1:
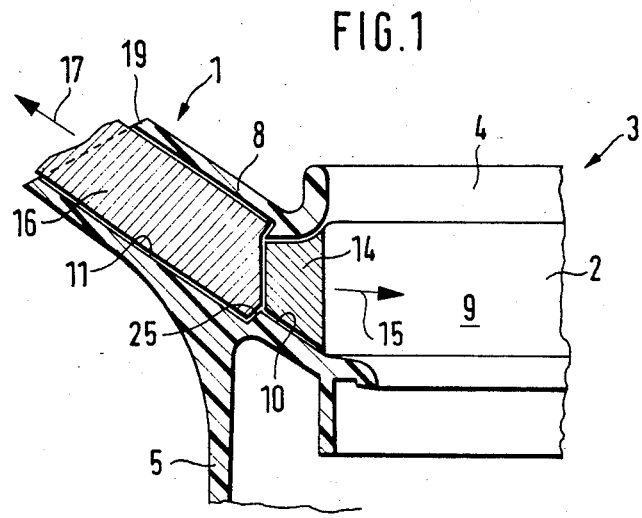
FIG. 1 diagrammatically shows in section view that portion of the pouring section which is formed on the container and also the cores for moulding this portion of the pouring section.
Figure 2:
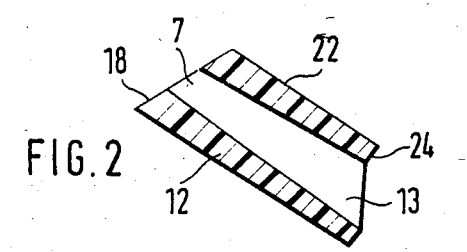
FIG. 2 shows in section view the internal portion of the pouring section.
Figure 3:
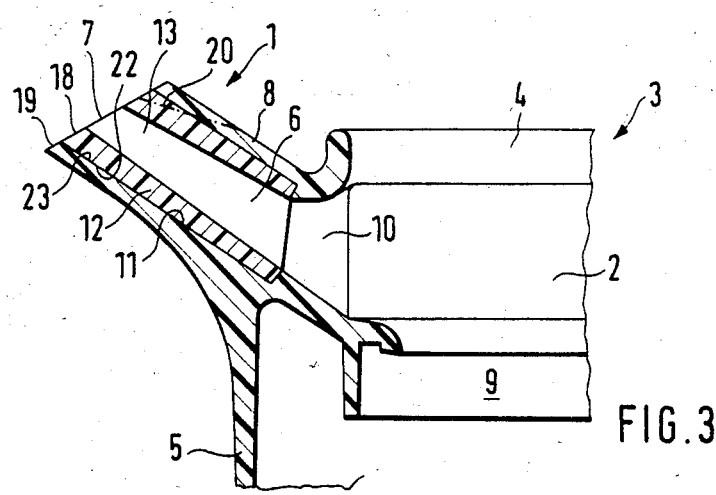
FIG. 3 shows in section view the internal portion which has been inserted into the widened part of that portion of the pouring section which is formed on the container.

FIGS. 1 to 3 show in section view the neck portion 2 of a container 3 which is made of synthetic material, the neck portion 2 having a pouring section 1. A plug (not represented) may be inserted, more particularly screwed, into the neck portion 2 of the container 3. In the case of the exemplary embodiment represented, the container 3 is constructed so that it can receive an insulating vessel (cf. FIG. 8). The container can, however, also be constructed so that it can receive liquid directly or can be formed or mounted on a vessel (not represented) for receiving liquids. The neck portion 2 of the container 3 has a neck opening 4 and also a casing 5 of which merely one portion is represented.

The pouring section 1 has a pouring channel 6 which is essentially cone-shaped and which widens towards the end in communication with the neck portion. The cross-section of the pouring channel 6 can be circular, ellipse-shaped or polygonal (with rounded-off edges). The pouring channel 6 is constructed in the case of the exemplary embodiment represented so that it tapers towards the outside.

It is essential that the pouring section 1 is constructed as a tube-like spout, that the pouring channel 6 is thus surrounded as far as the pouring opening 7.

When producing containers having pouring sections of this kind, difficulties arise in practice when removing from the mould. In other words, the core cannot be drawn out into the interior of the container as is necessary, more particularly in the case of pouring channel 6 which tapers towards the outside. This problem is overcome by constructing the pouring section 1 according to the invention.

The pouring section 1 consists of a portion 8 of the pouring section formed on the container 3 or on that portion of the container 3 which has the pouring section, a section of which portion 8 which faces the interior space 9 of the container 3 forming a section 10 of the cone-shaped pouring channel 6. Following that, the portion 8 which is formed on the container 3, has a widened part 11 which opens to the outside and which is cylinder-shaped or of widening cone-shaped form. An internal portion 12 of the pouring section 1 which comprises the remaining section 13 of the pouring channel 6 is inserted into the widened part 11 from the outside. The section 13 and the section 10 of the pouring channel 6 merge so that they are flush, when the internal portion 12 is inserted into the widened part 11, in such a way that a pouring channel 6 with optimum pouring action is formed.

That portion 8 of the pouring section 1 which is formed on the container 3 having the widened part 11 can be produced in a simple manner as no problems arise when releasing from the mould. As represented in FIG. 1, the core portion 14 which forms that section 10 of the pouring channel 6 which leads to the interior space can be drawn-out to the interior space 9 of the container 3, according to arrow 15, when releasing from the mould. The core portion 16 forming the widened part 11 can, on the other hand, be drawn-out towards the outside, according to arrow 17, upon removal from the mould. This is very simple, more particularly, when the widened part enlarges towards the outside in a cone-shaped manner.

The internal portion 12 of the pouring section 1 can be produced in a simple manner, as is easily seen from FIG. 2, and no special explanation is required.

In the embodiment of the pouring section represented in FIG. 3, that portion 8 of the pouring section 1 which is formed on the container 3 essentially completely surrounds the internal portion 12 of the pouring section 1, and the external front side 18, of the internal portion 12, and the external front side 19 of the portion 8 which is formed on the container 3 terminate so that they are flush. Special visual effects can be achieved hereby when the internal portion 12 is constructed in a different color compared with the container 3. Furthermore, through suitable construction of the front sides 18 and 19 a drip-removing edge, which is advantageous for the pouring action, can be formed.

As represented in FIG. 3 by a dash-and-dot line 20, the portion 8 which is formed on the container 3 need not necessarily completely surround the whole internal portion 12, whereby other visual effects can again be achieved when the internal portion 12 is constructed in a different color compared with the container 3.

According to another embodiment, as is represented in dotted lines in FIG. 5, the end section of the internal portion 12, which section points towards the outside, can jut out over the front side 19 of the portion 8, which is formed on the container 3 in such a way that only the front side 21 of this internal portion 12 points to the outside.

An embodiment of the internal portion 12 is shown in FIGS. 2 and 3, the outer wall 22 of the internal portion 12 terminating when insertion has taken place so that it is flush with the internal wall 23 of the widened part 11. Furthermore, the front side 24 of the internal portion 12 which side-points to the interior space, rests so that it is flush against a corresponding stepped wall 25 of the widened part 11. The internal portion 12 is advantageously inserted into the widened part 11 in a liquid-tight manner. This can be achieved through corresponding dimensioning of the internal portion 12 in respect of the widened part 11 in such a way that a press fit is possible. The internal portion 12 is advantageously glued or welded into the widened part 11.

As represented in FIG. 4, the internal portion 12 can also have essentially uniform wall thickness and can be held in the widened part 11, for example, can be welded or glued, in the widened part 11 solely in the region of the stepped wall 25 through the front side 24 and in the region of the pouring opening 7 through an outer wall section 26 at the front side 18. For the purposes of structural reinforcement, longitudinal and/or transverse ribs can be provided on the exterior (not represented).

The internal portion 12 can also be securely received in the widened part 11 by way of a locking connection, as represented by way of example in FIG. 5. The locking connection represented in FIG. 5 has, on the internal wall 23 of the widened part 11, projecting raised stop portions 27 and also a corresponding depression 28 in the outer wall 22 of the internal portion 12 or corresponding projections 29. In the state where the internal portion has been inserted into the widened part 11, the raised stop portions 27 engage into the depression 28 or behind the projection 29.

Furthermore, in order to guarantee that the internal portion 12 is received in the widened part 11 in a liquid-tight manner, it is advantageous if a sealing interlocking connection is also achieved between the front side 24 and the stepped wall 25. This can be achieved by means of sealing lips between both surfaces 24, 25. However, it is advantageous to provide in this region a tooth construction, in the case of which the front side 24 has, according to FIG. 6, a recess 30 which can also be circular, while the stepped wall 25 has one or more corresponding projections 31. On the other hand, as represented in FIG. 7, the front side 24 can have the projections 32 and the stepped wall 25 can have the recess 33. Finally, both constructions can alternate with each other over the peripheral course of the front side 24 and of the stepped wall 25 in such a way that an interlocked and liquid-tight engagement is achieved.

FIG. 8 shows the application of the invention in the case of an insulating jug constructed in a special way. The container 34 has a neck portion 35 having thread sections 36 for the purpose of screwing in a plug. The casing 37 of the container 34 extends over at least one substantial vertical section of the container 34. At the upper end of the container 34, that is, in the region of the neck portion 35, a handle 38 is formed on one side and on the opposite side a pouring section 39, which is constructed according to the invention, is provided. That means that the pouring section 39 forms a tube-like spout and has a cone-shaped pouring channel 40 which does not widen, at least towards the outside. Also here the pouring section consists of a portion 41, which is formed on the container 34, having a section 42 of the pouring channel and a widened part 43 and also an internal portion 44 having the other section 45 of the pouring channel, the internal portion 44 being inserted into the widened part 43. Furthermore, as represented in dotted lines, an insulating container 47 is inserted into the interior space 46 of the container 34.

In the case of this embodiment, the internal portion 44 projects a relatively long way over the front side 48 of the portion 41 which is formed on the container 34 and bears on the exterior a screen 49 which can cover the whole pouring area and the front side 50 of which comes to be installed on the outer wall of the casing 37 and of the neck portion 35. The installation can, as diagrammatically indicated in the region of the casing 37, take place in a springy manner. It appears that in this way, when the container 34 is a standardized basic model, different shapes of the pouring region can be achieved merely by means of a different form of construction of the internal portion 44 with screen 49.

It appears, furthermore, that the internal portion of the pouring section cannot only be produced from a material which is of a different color, but also from a different material that is, not only from synthetic material, but also, for example, from metal, porcelain or ceramics, so that there is not only a variety of shapes but also a possibility of choice of the material which will be optimum in each case.

Even the container or its portion carrying the pouring section need not only be made of synthetic material, but can also be made of metal, ceramics or the like that is, from every material which may be processed according to an injection moulding process.

Furthermore, this construction has, in addition, the special advantage that in the event of damage to the pouring section, which generally merely affects the latter's internal portion, this internal portion can be exchanged very easily for a new internal portion.

In this way, containers having a pouring section, which has optimum pouring action with full scope in terms of shape, can be made. Simple removal from the mould is thereby possible when producing the container so that cost-effective production can be achieved.

This holds true more particularly for the case where the casing 5 or 37 of the container 3 or 34 extends over a substantial vertical section in such a way that a core for the formation of the pouring channel cannot be drawn out downwards.

The method of producing such containers consists, with regard to the pouring section, in drawing the core portion 14 which forms the section 10 of the pouring channel 6 and which section faces the interior space 9 of the container 3, into the interior space 9 (arrow 15) while the core portion 16 which forms the widened part 11 is drawn off towards the outside (arrow 17), and in then inserting the internal portion 12 into the widened part 11 from the outside.

According to an advantageous development, an internal portion 12 which has been produced and released from its mould, can thereby be used instead of the core portion 16 and this can be injection-moulded around when producing the container 3, a firm and liquid-tight connection being thereby guaranteed between the internal portion 12 and that portion 8 of the pouring section 1 which is formed on the container 3.

Through the invention, containers, which have a pouring section, which is constructed as a closed spout, which has no external joints and which can be produced in a simple manner irrespective of the construction of the casing and of the pouring section itself, can thus be made such that the pouring channel can be designed with regard to optimum pouring action.

What is claimed is:

1. A pouring section for use with a container for liquids, said container having an open neck portion of injection-molded material on its upper end, said pouring section cooperating with said container and forming a tube-like spout through which liquid contents of said container can be poured, said tube-like spout comprising:
    a moldable member laterally projecting out of said neck portion of said container and having an open conduit communicating with said neck portion of said container, said molded member having
        a first portion communicating with said neck portion of said container and having a cylindrically shaped bore diverging toward the interior of said container, and
        a second portion communicating with said first portion and having a bore of substantially uniform cross sectional area and facing outward from said container; and
    a molded insert having an outside diameter and shape corresponding to said bore in said second portion of said molded member for insertion thereinto and having a channel therein for passage of liquid, said channel being conically shaped and diverging toward an outer wall of said container, such that wide end of said conically shaped channel fits flush up against said cylindrically shaped bore in said first portion of said molded member.

2. A pouring section for use with a container for liquids, said container having an open neck portion of injection-moldable material on its upper end, said pouring section cooperating with said container and forming a tube-like spout through which liquid contents of said container can be poured, said tube-like spout comprising:
    a molded member laterally projecting out of said neck portion of said container and having an open conduit communicating with said neck portion of said container, said molded member having:
        a first portion communicating with said neck portion of said container and having a conically shaped bore diverging toward the interior of said container, and
        a second portion communicating with said first portion and having a bore of substantially uniform cross sectional area and facing outward from said container; and
    a molded insert having an outside diameter and shape corresponding to said bore in said second portion of said molded member for insertion thereinto and having a channel therein for passage of liquid, said channel being conically shaped and diverging toward an outer wall of said container, such that a wide end of said conically shaped channel fits flush up against an opening at a tapered end of said conically shaped bore in said first portion of said molded member.

3. The apparatus according to claim 2, further comprised by said first portion of said molded member adjacent to said open neck portion of said container essentially completely surrounding said molded insert.

4. The apparatus according to claim 2, further comprised by said insert communicating with said second portion of said molded member is in a liquid-tight manner.

5. The apparatus according to claim 2, further comprised by said insert having sealing lips which engage with said second portion of said molded member in a liquid-tight manner.

6. The apparatus according to claim 2, further comprised by said insert being removably attached to said second portion of said molded member.

7. The apparatus according to claim 2 further comprised by said molded member being fabricated of a first injection-moldable material and said insert being fabricated of a second injection-moldable material.

8. The apparatus according to claim 2, further comprised by said insert and said second portion of said molded member has a series of corresponding alternating projections and recesses which interlock in a liquid-tight manner when said insert and said second portion of said moldable member are joined.

9. The apparatus according to claim 8 wherein said projections and recesses of said insert and said second portion enable the insert to be removably attached by a snap fit.

10. The apparatus according to claim 2, further comprised by said insert being fixedly attached to said second portion of said molded member.

11. The apparatus according to claim 10 wherein the insert is fixedly attached by gluing.

12. The apparatus according to claim 10 wherein the insert is fixedly attached by welding.

* * * * *